3,657,395
PROCESS FOR THE PRODUCTION OF HIGH IMPACT STRENGTH EPDM GRAFT COPOLYMERS
Curtis L. Meredith and George A. von Bodungen, Baton Rouge, La., assignors to Copolymer Rubber & Chemical Corporation, Baton Rouge, La.
No Drawing. Filed Jan. 14, 1970, Ser. No. 2,967
Int. Cl. C08f 25/00
U.S. Cl. 260—878 R    16 Claims

ABSTRACT OF THE DISCLOSURE

A new and improved EPDM rubber-modified plastic composition and method for its preparation wherein an alkenyl aromatic monomer, an acrylic monomer and an EPDM terpolymer are reacted in an organic solvent in the presence of a free radical catalyst, and wherein up to 40% by weight of the total amount of one of the monomers is withheld from the reaction mixture and is added in at least one increment to form a final reaction mixture when the monomer not withheld is at least 10% converted.

---

This invention relates to the preparation of plastic compositions, and more particularly to EPDM rubber-modified plastic compositions having improved properties.

A variety of high-impact or gum plastics, which are generally referred to in the art as "rubber-modified plastics," and methods for their preparation have been proposed. However, many of the plastics prepared by the prior art processes have failed to achieve optimum properties of all respects including impact resistance, tensile strength and hardness.

Substantial improvements in preparing rubber-modified plastic have been made by a simple one-step process disclosed in copending application, Ser. No. 626,930, filed Mar. 30, 1967, now Pat. No. 3,538,191 and entitled "A Process for Preparing Rubbery Plastic Compositions and the Resultant Products" wherein description is made of a process for preparing rubber-modified styrene-acrylic grafted terpolymers by interpolymerizing a rubbery polymer, an alkenyl aromatic monomer, such as styrene, and an acrylic monomer in the presence of an organic solvent. Rubber-modified plastics prepared by this process have been found to possess a variety of improved physical properties, such as improved impact resistance, as compared to rubber-modified plastics heretofore known.

It is an object of this invention to provide and to produce rubber-modified plastics having further improved properties, and it is a related object of the present invention to prepare improved EPDM rubber-modified plastics.

It is another object of the present invention to provide a new and improved polymerization process for preparing EPDM rubber-modified plastics wherein such plastics may be prepared in a simple economical step by the simultaneous grafting of an EPDM rubbery polymer with a resinous copolymer.

Other objects and advantages of the invention will appear hereinafter, and it will be understood that the specific examples appearing hereinafter are provided by way of illustration and not by way of limitation.

The concept of the present invention resides in a process for preparing rubber-modified plastic compositions in which a rubbery EPDM polymer, an alkenyl aromatic monomer and an acrylic monomer are interpolymerized in the presence of an organic solvent, and wherein one of the monomers is added to the reaction mixture in one or more increments as the reaction proceeds. The resulting polymers have been found to possess impact strengths, as well as other properties, which are superior to those of polymers prepared by interpolymerization of the same components without the incremental addition of one of the monomers.

In accordance with the practice of the present invention, a portion of either the alkenyl aromatic monomer or the acrylic monomer may be held out from the initial reaction mixture and added incrementally during the course of the reaction. In the preferred embodiment, a portion of the alkenyl aromatic monomer is withheld from the initial reaction mixture and added to the initial reaction mixture in one or more increments after the acrylic monomer present in the initial reaction mixture is partially converted. Without limiting the present invention as to theory, it is believed that the incremental addition of the alkenyl aromatic monomer causes an increase in the amount of the acrylic component in the grafted EPDM rubbery backbone, which in turn increases the mechanical strength of the backbone polymer.

Thus, in the practice of the present invention, the initial reaction mixture is formulated to contain an organic solvent, a free radical catalyst or initiator, an EPDM rubbery polymer, an amount of one of the monomers which corresponds to the monomer desired to be present in the final reaction mixture and the other monomer in an amount which constitutes 60–99% by weight of the amount of the other monomer desired to be present in the final reaction mixture. The remaining 1–40% by weight of the second monomer is thereafter added to the initial reaction mixture in one or more increments after the reaction has proceeded to at least 10% conversion based upon the monomer not witheld from the initial reaction mixture. As used herein, the term "incremental addition" is intended to mean and include the addition of the withheld monomer in one or more steps, as well as the continuous addition of the monomer over a period of time.

It has been found that the amount of alkenyl aromatic and acrylic monomers which are grafted onto the EPDM rubbery backbone is an amount which is sufficient to provide an optimum degree of compatibility between the rubbery EPDM polymer and the copolymer resin simultaneously formed. Thus, the final reaction mixture should be formulated to contain 1–50 parts by weight, and preferably 4–25 parts by weight, of the EPDM polymers for each 99 to 50 parts by weight, and preferably 96 to 75 parts by weight, of the total of the alkenyl aromatic and acrylic monomers, with the weight ratio between the alkenyl aromatic monomer and the acrylic monomer in the final reaction mixture after incremental addition of the withheld monomer being with the range of 65/35 to 80/20, and preferably within the range of 72/28 to 75/25. As indicated above, the initial reaction mixture is formulated to include the reactants in the foregoing proportion, except that 1–40% by weight, and preferably 10–20% by weight of one of the monomers is withheld from the reaction mixture, and is added in at least one increment after the reaction has proceeded to at least 10% conversion based upon the monomer not withheld to provide the final reaction mixture.

The reaction mixture also contains a free radical catalyst or initiator, present in an amount within the range of 0.25 to 2.5 parts by weight, and more preferably in the range of 0.5 to 1.3 parts by weight, of the free radical catalyst or initiator for each 100 parts by weight of the total of the alkenyl aromatic monomer and the acrylic monomer. Additionally, the reaction mixture contains an organic solvent. Better results are frequently attained when the organic solvent content of the reaction mixture is varied between 50% by weight of the total weight of the final reaction mixture at the lower limit of the EPDM terpolymer content mentioned above and 90% by weight thereof when the upper EPDM terpolymer range mentioned above is employed. When the preferred range of the rubbery EPDM terpolymer is used, i.e. 4–25% by weight EPDM terpolymer, then the solvent should be present in an amount constituting 85–60% by weight of the total reaction mixture.

The alkenyl aromatic monomers which may be used in the preparation of improved rubber-modified plastics according to the present invention include alkenyl aromatic hydrocarbons containing 8–20 carbon atoms, and their halogenated derivatives. Specific examples of such monomers include styrene, chlorostyrene, alpha-alkyl styrene wherein the alkyl group contains 1–8 carbon atoms, such as alpha-methylstyrene, alpha-chlorostyrene, vinyl naphthalene, alkyl-substituted vinyl naphthalene where the alkyl group or groups contain 1–8 carbon atoms, and halogen-substituted vinyl naphthalene. Styrene is generally the preferred alkenyl aromatic monomer.

The acrylic monomer which may be used in the present invention or those monomers having a general formula:

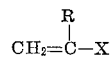

wherein R is selected from a group consisting of hydrogen and alkyl having 1–5 carbon atoms, and X is selected from a group consisting of:

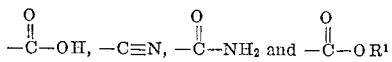

wherein $R^1$ is alkyl having 1–9 carbon atoms. Examples of such monomers which have been found to be of particular use including acrylonitrile, acrylamide, methylene or ethylene acrylonitrile, acrylic, methacrylic, and ethylacrylic acid and the methyl, ethyl, propyl and isopropyl esters thereof. Acrylonitrile is generally the preferred acrylic monomer.

The EPDM terpolymers useful in the present invention are generally those elastomers prepared by the reaction of ethylene, at least one other straight chain alpha-monoolefin having 3–16 carbon atoms, such as propylene, isobutylene, etc., and an aliphatic or cycloaliphatic polyene monomer having 4–20 carbon atoms.

The polyene monomers can be conjugated dienes, such as 1,3-butadiene, isoprene, chloroprene, 1,4-hexadiene, as well as a variety of other conjugated polyenes, but are preferably non-conjugated aliphatic and cycloaliphatic dienes such as non-conjugated hexadiene, octadiene, etc. Terpolymers prepared from the foregoing generally have relatively low unsaturation and their preparation is known to those skilled in the art.

The preferred EPDM elastomers having relatively low unsaturation are those prepared by the interpolymerization of a monomeric mixture containing 10–90 mole percent ethylene and 10–90 mole percent of at least one other straight chain alpha-monoolefin containing 3–16 carbon atoms and preferably propylene, and from 0.1 to 10 mole percent of an unsaturated bridged-ring hydrocarbon having at least one carbon-to-carbon double bond in a bridged ring in a solution of hexane or other organic solvent and in the presence of a catalyst prepared from vanadium oxytrichloride and methyl or ethyl aluminum sesquichloride or other suitable Ziegler catalyst. The preparation of such EPDM terpolymers is disclosed in U.S. Pat. 2,933,480, 3,093,620, 3,093,621, 3,211,709, 3,113,115 and 3,300,450, the teachings of which are incorporated herein by reference.

It is preferred that the elastomers having low unsaturation be prepared from a monomeric mixture containing ethylene, propylene and the polyunsaturated bridged-ring hydrocarbon, in proportions to produce a polymer having good elastomeric properties and an unsaturation level of at least 2 carbon-to-carbon double bonds per thousand carbon atoms in the polymer. For example, the elastomer may contain chemically bound therein molar ratios of ethylene to propylene varying between 90:20 and 20:90, and between 70:30 and 55:45 for better results. The bridged-ring hydrocarbon may be chemically bound therein in an amount of provide an unsaturation level of 2–25, and preferably about 3–16 carbon-to-carbon double bonds per thousand carbon atoms in the polymer.

Examples of the bridged-ring hydrocarbons include the polyunsaturated derivatives of bicyclo-(2,2,1)-heptane wherein at least one double bond is present in one of the bridged rings, such as dicyclopentadiene, bicyclo(2,2,1) hepta-2,5-diene, the alkylidene norbornenes, and especially the 5-alkylidene-2-norbornenes, wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged-ring hydrocarbons include polyunsaturated derivatives of bicyclo-(2,2,2)-octane as represented by bicyclo(2,2,2) octa-2,5-diene, polyunsaturated derivatives of bicyclo(3,2,1)-octane, polyunsaturated derivatives of bicyclo(3,3,1)-nonane, and polyunsaturated derivatives of bicyclo-(3,2,2)-nonane. At least one double bond is present in a bridged ring of the above compounds, and at least one other double bond is present in a bridged ring or in a side chain. Specific examples of bridged-ring compounds include 5-methylene-2-norbornene, 5-ethylidene-2-norbornene, 5-isopropylidene-2-norbornene, dicyclopenadiene, the methyl butenyl norbornenes such as 5-(2-methyl-2-butenyl)-2-norbornene, or 5-(3-methyl-2-butenyl)-2-norbornene and 5-(3,5-dimethyl-4-hexenyl)-2-norbornene. The elastomers prepared from ethylene, at least one monolefin containing 3–16 carbon atoms, and the 5-alkylidene-2-norbornenes, wherein the alkylidene group contains 1–20 and preferably 1–9 carbon atoms, produce novel rubber-modified plastics which have exceptional properties. The elastomer prepared from 5-ethylidene-2-norbornene is much preferred as it has outstanding properties and produces many unusual and unexpected results when used as the elastomer in the plastic compositions of the invention. As a result, this elastomer is in a class by itself.

In instances where an elastomer is employed which has no unsaturation or very little unsaturation, then it is often desirable to prepare a hydroperoxide thereof by oxidation prior to the polymerization step of the present invention. The oxidation may be in accordance with prior art practice, such as by heating a solution of the elastomer in the presence of molecular oxygen and an organic peroxide or hydroperoxide as a catalyst. In one suitable method, the elastomer is dissolved in a mixture of benzene and hexane, and benzoyl peroxide is added as a catalyst for the oxidation. The reaction vessel is pressurized to 50 p.s.i. with oxygen and maintained at 70° C. for 0.5 to 8 hours. Oxidation can also be effected without a free radical catalyst by reacting for 2–10 hours. The resin monomers are added to the solution of the oxidized rubber, with or without adding an additional free radical catalyst, and polymerized to form a rubber-modified plastic according to the present invention. The hydroperoxide groups may alone act as the free radical catalyst for the monomer polymerization. It is understood that the elastomer may be oxidized to form hydroperoxide groups thereon whenever there is difficulty in reacting the elastomer substrate with the graft monomers in the desired amounts to thereby achieve greater ease of grafting.

A wide variety of free radical polymerization catalysts may be employed, including those used in the prior art processes for preparing high impact polystyrene and styrene-acrylonitrile plastics. In some instances, the hydroperoxide groups that are formed by oxidation of the rubbery component may act as the free radical catalyst. Examples of free radical polymerization catalysts include the organic peroxides such as benxoyl peroxide, lauroyl peroxide, propionyl peroxide, 2,4-dichlorobenzoyl peroxide, acetyl peroxide, tertiary butyl hydroperoxide, tertiary butyl perbenzoate, tertiary butyl peroxyisobutyrate, and dicumylperoxide. Mixtures of one or more peroxides may be employed. Additionally, mixtures of one or more peroxides with azo-bis-diisobutyronitrile give better results in some instances, and especially where a less active catalyst is effective. For example, when using the highly unsaturated diene rubbers, or rubbers of low or high unsaturation that have been subjected to an oxidation step to form hydroperoxide groups thereon, then a less active free radical catalyst should be used for optimum results. The catalyst mixture may contain 25–75% and preferably about 50% by weight of the azo-bis-diisobutyronitrile, and 75–25%, and preferably about 50% by weight, of one or more of the above organic peroxides. In instances where an unoxidized elastomer is used having a low degree of unsaturation, then it is desirable to employ a highly active free radical initiator, e.g., a prior art initiator which is known to exstract hydrogen from the elastomer and rapidly catalyze the graft reaction. Many examples of such highly active free radical initiators are known, such as benzoyl peroxide.

The organic solvent that is selected must be a solvent for the rubbery polymer. Examples of suitable solvents include aromatic hydrocarbons such as benzene, benzene substituted with one or more alkyl groups containing 1–4 carbon atoms such as toluene, dimethylbenzene, xylene and their higher homologs, naphthalene, naphthalene substituted with one or more alkyl groups containing 1–4 carbon atoms such as alpha-methyl or beta-methyl naphthalene and their higher homologs, paraffin and cycloparaffin hydrocarbons containing 5–15 carbon atoms, and preferably 6–10 carbon atoms, such as pentane, n-hexane, 3-methylpentane, 2-methylpentane, 2,2-and 2,4-dimethylpentane, heptane, cyclopentane, cyclohexane, and alkyl-substituted cyclopentanes and cyclohexanes wherein the alkyl group or groups contain 1–4 carbon atoms, including methyl cyclopentane, methyl cyclohexane and their homologs. The halogenated derivatives of the above solvents may be employed, and especially the chlorine and bromine derivatives. Chlorobenzene is very useful as a solvent.

Mixtures containing two or more of the foregoing solvents may be used, and are preferred in many instances. Examples of solvent mixtures which give unusually good results include an aromatic component such as benzene and/or toluene, and a paraffin or cycloparaffin hydrocarbon component containing six through eight carbon atoms such as n-hexane, 3-methylpentane, 2-methylpentane, n-heptane, methyl hexanes, n-octane, methyl octanes, methylcyclopentane, and/or cyclohexane.

Usually better results are obtained when the above solvent mixtures contain about 40–60% by weight of the aromatic solvent component, and about 60–40% by weight of the paraffin or cycloparaffin hydrocarbon component. Best results are usually obtained when about 50% by weight of each component is present.

The temperature of the polymerization may vary over wide ranges. For instance, reaction temperatures of approximately 40–150° C., and preferably about 60–80° C. are usually satisfactory. The polymerization is continued for a sufficient period of time to assure a desired percent conversion of the monomers. This will vary somewhat with the specific catalyst, solvent, rubbery polymer, monomers, and reaction temperature that are employed. However, reaction times of about 4–24 hours are usually satisfactory. In any event, preferably the reaction is continued until at least 60% by weight of the monomeric material initially present has been converted to polymer, and for best results 90–95% by weight.

The reaction mixture also may contain a cross-linking agent, i.e., a compound containing at least two reactive sites such as two or more ethylenic double bonds. Examples of cross-linking agents are divinylbenzene, divinyl ether of diethylene glycol, triallylcyanurate, and 1,3-butylene-dimethacrylate. The cross-linking agent may be added in an amount of, for example, 0.005–1.0 part by weight, and preferably about 0.01 to 0.5 part by weight, per 100 parts by weight of the monomeric material to be polymerized. Still other types of cross-linking agents may be employed as it is only necessary that it have two or more reactive sites under the conditions of the polymerization.

The reaction mixture may be agitated during the polymerization but vigorous agitation is not necessary. As the polymerization proceeds, the resinous polymer that is formed generally precipitates in a finely dispersed form and remains suspended in the reaction mixture. Thus, the polymerization reaction simultaneously produces a resinous terpolymer of the alkenyl aromatic and acrylic monomers and the EPDM terpolymers grafted with the resin-forming alkenyl aromatic and acrylic monomers. As a result, at the end of the polymerization, the reaction mixture contains all the components which are needed for a high impact plastic composition, and it is only necessary to recover the products of the polymerization therefrom.

The plastic composition may be recovered from the reaction mixture by coagulation with a lower alcohol such as methyl, ethyl or isopropyl alcohol, or by flashing off the solvent. When the product is recovered by flashing the solvent, preferably the reaction mixture is passed into a vessel containing heated water. Steam is supplied to the vessel and the solvent evaporates and is removed overhead as a vapor, together with any free monomer content. The plastic product is recovered as a solid in particulate form, and it may be dewatered, washed in water to remove water-soluble impurities, and dried in a prior art oven at 50–100° C. until the water content is removed. Fluidized bed drying at 50–100° C. also may be used in most instances with good results. The dried plastic composition may be pelletized or formed into other desirable shapes suitable for marketing.

Prior art antioxidants, processing aids, and other compounding ingredients and aids may be added at any convenient point in the process. Inasmuch as these ingredients are soluble or dispersible in the organic solvent, they may be added to the polymerization mixture prior to recovery of the product. Examples of suitable antioxidants include phosphited polyalkyl polyphenols and tri(mixed mononyldinonyl) phenyl phosphite. Examples of processing aid are mineral oils and the salts and esters of higher fatty acids. When desired, coloring agents may be added to produce colored resins. The coloring pigments of the prior art are suitable for this purpose.

The high impact plastic compositions prepared by the process of the present invention have superior physical properties, and particularly superior impact strength. Additionally, by using the preferred EPDM terpolymers having low unsaturation, particularly the terpolymers of ethylene, propylene and 5-alkylidene-2-norbornene, even better physical properties may be obtained.

As indicated, the preferred polyenes are the 5-alkylidene-2-norbornenes, wherein the alkylidene group contains 1–8 carbon atoms, with the preferred species being 5-ethylidene-2-norbornene.

Reference is now made to the following examples which are illustrative of the principal concepts of the present invention.

EXAMPLE 1

Run 1

A 90 gram portion of a terpolymer, which is an interpolymer of ethylene, propylene and 5-ethylidene-2-norbornene which contains chemically bound therein approximately equal weights of ethylene and propylene and sufficient 5-ethylidene-2-norbornene to provide an unsaturation level of 8.7 carbon-to-carbon double bonds per 1000 carbon atoms and which has a Mooney value of 66(ML-4), is dissolved in 1400 grams of a mixture of hexane and benzene.

The solution is charged to a reactor equipped with a stirrer, and then 450 g. of styrene, 150 g. of acrylonitrile and 6.0 g. of benzoyl peroxide are added. The reactor is then heated to 70° C. for a period of 20 hours with constant agitation.

The resulting rubber-modified plastic is recovered from the reaction mixture by the addition of isopropyl alcohol whereby the plastic is precipitated in the form of small particles. The particles are collected, washed and tested for Izod impact strength. The results are tabulated in Table I.

Run 2

A 90 gram sample of the terpolymer used in Run 1, dissolved in the same quantity of solvent, is mixed in the same reactor with 150 g. acrylonitrile, 6.0 g. of benzoyl peroxide and 386 g. of styrene. The reactor is heated to 70° C. with agitation for 2 hours, after which 64 g. of styrene are added.

The reaction is again allowed to proceed at 70° C. for 18 hours, and the product is separated in the manner shown in Run 1. The results of Izod impact strength tests conducted on the resulting product are shown in Table I.

Run 3

The procedure utilized in Runs 1 and 2 is repeated except that the initial charge to the reactor contained 282 g. of styrene. The reactor is heated with agitation to 70° C. for 2 hours at which time the balance of 168 g. of styrene is continuously added to the reactor over a 2-hour period.

The resulting product is separated, and tested for impact strength, the results of the test being tabulated in Table I.

Run 4

The procedure used in Runs 1 to 3 is again repeated except that the initial charge to the reactor includes 150 g. of styrene. The remaining 300 g. are continuously added over a 2-hour period after the reaction is allowed to proceed for 2 hours.

Results of tests performed on the resulting product are shown in Table I.

TABLE I

| Run No.: | Styrene/acrylonitrile ratio | | Percent styrene held out | Izod impact strength |
|---|---|---|---|---|
| | Initial | Final | | |
| 1 | 75/25 | 75/25 | None | 3.03 |
| 2 | 72/28 | 75/25 | 14.2 | 6.15 |
| 3 | 65/35 | 75/25 | 37.5 | 4.13 |
| 4 | 50/50 | 75/25 | 66.7 | 0.70 |

As can be seen from the results tabulated in the foregoing table, the use of the concepts of the present invention whereby up to 40% of the total amount of one of the monomers is withheld from the initial reaction mixture results in improved rubber-modified plastic products having improved impact strength as compared to products wherein all of the recipe is included in the initial reaction mixture.

EXAMPLE 2

This example illustrates the favorable effect on the product of withholding the acrylic monomer from the initial reaction mixture.

A sample of 90 g. of the EPDM terpolymer used in Example 1 is dissolved in 1400 g. of a mixture of benzene and hexane, and charged to the reactor described in Example 1. To the reactor are added 6 g. of benzoyl peroxide, 432 g. of styrene and 148 g. of acrylonitrile to provide an initial styrene/acrylonitrile ratio of 78/22.

The reactor is heated to a temperature of 70° C. for a period of 2 hours, after which 20 g. (12%) of acrylonitrile are continuously added over a 2-hour period to form final reaction mixture with a styrene-acrylonitrile weight ratio of 72/28. The reaction is carried to completion, and the resulting product is separated in the same manner shown in Example 1.

Izod impact strength tests show that the product has an impact strength of 4.88.

By way of comparison, rubber modified plastics produced in the same manner except that both the initial and final styrene-acrylonitrile ratios are 77/23, where no acrylonitrile is added once the reaction is initiated, have an Izod impact strength of 3.42.

EXAMPLE 3

In this example 108 g. of the EPDM rubber used in Example 1 are dissolved in 1400 g. of a mixture of benzene and hexane, and the resulting solution is placed in a reactor equipped with an agitator. Also added to the reactor are 6 g. of benzoyl peroxide, 373 g. of styrene and 120 g. of acrylonitrile to provide an initial reaction mixture having a styrene-acrylonitrile ratio of 70/30.

After 2 hours of reaction, 107 g. of styrene, representing 22.3% of the total styrene used in the reaction, are added to the reaction vessel to provide a final reaction mixture having a styrene-acrylonitrile ratio of 80/20.

The resulting product is found to have an Izod impact strength of 5.13.

EXAMPLE 4

In this example, the EPDM terpolymer is an interpolymer of ethylene, propylene and dicyclopentadiene having an ethylene-propylene ratio of 58:42 and containing 3% by weight dicyclopentadiene, and is dissolved in a toluene-hexane solvent system.

The terpolymer is reacted with alpha-methylstyrene and a methacrylic acid in the presence of a free radical catalyst in the manner shown in Example 3 except that the initial reaction mixture contains 88% by weight of the alpha-methylstyrene to be reacted.

When 30% by weight of the methacrylic has been converted (after about 3 hours), the remaining 12% of the alpha-methylstyrene is added to reaction mixture.

The product is separated from the reaction mixture by means of the addition of isopropyl alcohol, and is found to have a high impact strength.

EXAMPLE 5

The terpolymer used in Example 4 is reacted in this example with methyl acrylate and vinyl naphthalene in the presence of dicumyl peroxide as the catalyst.

The initial reaction mixture contained 83% of the vinyl naphthalene to be reacted with the remaining 17% being held out for a period of 3½ hours. Thereafter, the balance of the vinyl naphthalene is added continuously over a period of 3 hours. The resulting product is found to have an Izod impact strength of 5.2.

EXAMPLE 6

The EPDM terpolymer employed in this example contains ethylene and propylene in a weight ratio of 55/45 and 4.1% by weight of 5-methylene-2-norbornene and has an unsaturation level corresponding to about 3 carbon-to-carbon double bonds per 1000 carbon atoms.

The terpolymer is dissolved in a solvent, and is reacted with alpha-chlorostyrene and methacrylonitrile. 80% of the alpha-chlorostyrene to be reacted is included in the initial reaction mixture, with the balance being added in one increment after the reaction is allowed to proceed for 2 hours.

The product is found to have an impact strength of 4.9.

EXAMPLE 7

The EPDM terpolymer employed in this example contains ethylene and propylene in approximately equal parts by weight, and sufficient 1,4-hexadiene in an amount sufficient to provide an unsaturation level of about 3 carbon-to-carbon double bonds per 1000 carbon atoms.

This terpolymer is dissolved in an organic solvent and is reacted with styrene and acrylonitrile. 85% of the styrene to be reacted is included in the initial reaction mixture, with the balance being added in one increment after the reaction has proceeded for about 1.5 hours.

The product is separated from the reaction mixture in the manner described in Example 1, and is found to have an excellent impact strength.

It will be apparent from the foregoing that we have provided a new and improved method for preparing EPDM rubber-modified plastics which have improved properties, including improved impact resistance, as compared to those rubber-modified plastics heretofore known. The novel products of the present invention may be prepared by a simple and economical process which completely avoids the requirements for multiple steps as processes heretofore known.

It will be understood that various changes may be made in the details of formulation and operation without departing from the spirit of the invention, especially as defined in the following claims.

We claim:

1. A process for preparing plastic compositions having an improved impact strength comprising the steps of forming an initial reaction mixture comprising (1) an alkenyl aromatic monomer selected from the group consisting of styrene, alpha-methylstyrene, chlorostyrene and vinyl naphthalene (2) an acrylic monomer selected from the group consisting of acrylonitrile, methacrylonitrile, methacrylic acid, acrylic acid and methyl, ethyl, propyl and isopropyl methacrylates and (3) a terpolymer of ethylene propylene, and a polyene selected from the group consisting of a 5-alkylidene-2-norbornene wherein the alkylidene group contains 1–8 carbon atoms, dicyclopentadiene and 1,4-hexadiene in an organic solvent, wherein up to about 40% by weight of the total amount of one of said monomers to be reacted is withheld from said initial reaction mixture, reacting said initial reaction mixture in the presence of a free radical catalyst for a time sufficient to convert at least 10% by weight of the monomer not withheld, adding the balance of said monomer to the reaction mixture in at least one increment to form a final reaction mixture, reacting said final reaction mixture and separating the resulting plastic composition.

2. A process as defined in claim 1 wherein said polyene compound is a 5-alkylidene-2-norbornene.

3. A process as defined in claim 1 wherein said elastomeric terpolymer is a terpolymer of ethylene, propylene and 5-ethylidene-2-norbornene.

4. A process as defined in claim 1 wherein said final reaction mixture contains said alkenyl aromatic monomer and said acrylic monomer in a said ratio within the range of 65/35 to 80/20.

5. A process as defined in claim 1 wherein said initial reaction mixture contains said alkenyl aromatic monomer and said acrylic monomer in said ratio within the range of 72/28 to 75/25.

6. A process as defined in claim 1 wherein between 1–40% by weight of one of said monomers is withheld from the initial reaction mixture.

7. A process as defined in claim 1 wherein between 10–20% of one of said monomers is withheld from said initial reaction mixture.

8. A process as defined in claim 1 wherein the monomer withheld from the reaction mixture is added after the monomer not withheld is at least 20% converted.

9. A process as defined in claim 1 wherein the monomer withheld from the initial reaction mixture is said alkenyl aromatic monomer.

10. A process as defined in claim 1 wherein said alkenyl aromatic monomer is styrene.

11. A process as defined in claim 10 wherein said styrene is the monomer withheld from said initial reaction mixture.

12. A process as defined in claim 1 wherein said final reaction mixture contains 1–50 parts by weight of said terpolymer for each 99–50 parts by weight of the total of said alkenyl aromatic and acrylic monomer.

13. A process as defined in claim 1 wherein said final reaction mixture contains 4–25 parts by weight of said terpolymer for each 96–75 parts by weight of the total of said alkenyl aromatic and acrylic monomer.

14. A process as defined in claim 1 wherein said organic solvent is selected from the group consisting of aromatic hydrocarbons and their alkyl and halogen-substituted derivatives, aliphatic hydrocarbons and their halogenated derivatives and mixtures thereof.

15. A process as defined in claim 1 wherein said solvent is a mixture of an aromatic solvent and an aliphatic solvent.

16. A process as defined in claim 1 wherein the reaction is carried out at a temperature within the range of 40–150° C.

References Cited

UNITED STATES PATENTS

| | | | |
|---|---|---|---|
| 3,489,821 | 1/1970 | Witt et al. | 260—878 R |
| 3,538,190 | 11/1970 | Meredith et al. | 260—878 R |
| 3,538,191 | 11/1970 | Meredith et al. | 260—878 R |

JOSEPH L. SCHOFER, Primary Examiner

A. HOLLER, Assistant Examiner